(12) United States Patent
Lin et al.

(10) Patent No.: US 9,479,540 B2
(45) Date of Patent: *Oct. 25, 2016

(54) USER-BASED NETWORK ONBOARDING

(71) Applicant: AEROHIVE NETWORKS, INC., Sunnyvale, CA (US)

(72) Inventors: Mu Lin, Sunnyvale, CA (US); Xu Zou, San Jose, CA (US); John Hanay, Palo Alto, CA (US)

(73) Assignee: Aerohive Networks, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/868,347

(22) Filed: Sep. 28, 2015

(65) Prior Publication Data

US 2016/0021144 A1 Jan. 21, 2016

Related U.S. Application Data

(63) Continuation of application No. 14/180,297, filed on Feb. 13, 2014, now Pat. No. 9,152,782.

(60) Provisional application No. 61/916,088, filed on Dec. 13, 2013.

(51) Int. Cl.
*H04L 29/06* (2006.01)
*G06F 21/44* (2013.01)
(Continued)

(52) U.S. Cl.
CPC .............. *H04L 63/20* (2013.01); *G06F 21/44* (2013.01); *G06F 21/45* (2013.01); *H04L 63/102* (2013.01); *H04L 63/105* (2013.01); *H04L 67/34* (2013.01)

(58) Field of Classification Search
CPC ...................................................... H04L 63/20
See application file for complete search history.

(56) References Cited

U.S. PATENT DOCUMENTS

| 7,057,566 B2 | 6/2006 | Theobold |
| 7,085,224 B1 | 8/2006 | Oran |

(Continued)

OTHER PUBLICATIONS

Chung, Sean, et al. "2TAC: Distributed Access Control Architecture for" Bring Your Own Device" Security." BioMedical Computing (BioMedCom), 2012 ASE/IEEE International Conference on. IEEE, 2012.*

(Continued)

*Primary Examiner* — Shawnchoy Rahman
(74) *Attorney, Agent, or Firm* — Sheppard, Mullin, Richter & Hampton LLP

(57) ABSTRACT

A network security system including a first-level security profile engine and a second-level security profile engine is disclosed. The first-level security profile engine may assign a first-level security profile for a first user device, the first user device requesting access to a network; the second-level security profile engine assigns a first second-level security profile to the first user device, the first second-level security profile providing first network configuration information for the first user device; a device selection engine receives a selection of a second user device associated with the first-level security profile; and the second-level security profile engine assigns a second second-level security profile to the second user device, the second second-level security profile providing second network configuration information for the second user device. A device network configuration engine can then configure the first user device to access the network based on the first network configuration information.

20 Claims, 11 Drawing Sheets

(51) Int. Cl.
*G06F 21/45* (2013.01)
*H04L 29/08* (2006.01)

(56) References Cited

U.S. PATENT DOCUMENTS

| | | | |
|---|---|---|---|
| 7,164,667 B2 | 1/2007 | Rayment et al. | |
| 7,181,530 B1 | 2/2007 | Halasz et al. | |
| 7,251,238 B2 | 7/2007 | Joshi et al. | |
| 7,409,588 B2 | 8/2008 | Yako et al. | |
| 8,140,888 B1 | 3/2012 | Dhingra et al. | |
| 8,174,966 B2 | 5/2012 | Taniguchi et al. | |
| 8,321,793 B1 | 11/2012 | Cotter et al. | |
| 8,869,235 B2 | 10/2014 | Qureshi et al. | |
| 8,893,255 B1 | 11/2014 | Martini | |
| 9,032,506 B2 * | 5/2015 | Parla | 370/351 |
| 2002/0129146 A1 | 9/2002 | Aronoff et al. | |
| 2003/0126240 A1 | 7/2003 | Vosseler | |
| 2005/0086255 A1 | 4/2005 | Schran et al. | |
| 2006/0026289 A1 | 2/2006 | Lyndersay et al. | |
| 2006/0179475 A1 | 8/2006 | Zhang et al. | |
| 2007/0078663 A1 | 4/2007 | Grace | |
| 2007/0140191 A1 | 6/2007 | Kojima | |
| 2007/0150603 A1 | 6/2007 | Crull et al. | |
| 2007/0198713 A1 | 8/2007 | Tsao et al. | |
| 2008/0077791 A1 | 3/2008 | Lund et al. | |
| 2008/0126845 A1 | 5/2008 | Luo et al. | |
| 2009/0019182 A1 | 1/2009 | Riise et al. | |
| 2009/0059874 A1 | 3/2009 | Carter | |
| 2009/0327484 A1 | 12/2009 | Chen et al. | |
| 2010/0095359 A1 | 4/2010 | Gordon | |
| 2010/0112540 A1 | 5/2010 | Gross et al. | |
| 2010/0257399 A1 | 10/2010 | Brown et al. | |
| 2010/0325259 A1 | 12/2010 | Schuler | |
| 2011/0040867 A1 | 2/2011 | Kalbag | |
| 2011/0067084 A1 | 3/2011 | Byun et al. | |
| 2012/0159531 A1 | 6/2012 | O'Callaghan | |
| 2013/0254831 A1 * | 9/2013 | Roach | H04L 63/107 726/1 |
| 2013/0254889 A1 | 9/2013 | Stuntebeck | |
| 2014/0092884 A1 | 4/2014 | Murphy et al. | |
| 2014/0101439 A1 | 4/2014 | Pettigrew et al. | |
| 2014/0156841 A1 | 6/2014 | Fu et al. | |
| 2014/0196129 A1 | 7/2014 | Amin | |
| 2014/0258231 A1 | 9/2014 | Birk et al. | |
| 2014/0281672 A1 | 9/2014 | Fu et al. | |
| 2014/0282902 A1 | 9/2014 | Zou et al. | |
| 2014/0282916 A1 | 9/2014 | Gast | |
| 2014/0304808 A1 | 10/2014 | Martini | |
| 2014/0330944 A1 | 11/2014 | Dabbiere et al. | |
| 2014/0351370 A1 | 11/2014 | Ashley et al. | |
| 2016/0029155 A1 | 1/2016 | Kerr et al. | |

OTHER PUBLICATIONS

Chen, Minder et al., "Providing Web Services to Mobile Users: The Architecture Design of an m-Service Portal," International Journal of Mobile Communications, vol. 3, No. 1, pp. 1-18, May 2005.

Cisco Systems, Inc., "Cisco TrustSec™ 2.0: Design and Implementation Guide," Document Version 2.0, Nov. 29, 2011.

Cisco Systems, Inc., "TrustSec How-To Guide: On-boarding and Provisioning," Document Version 3.0, Aug. 27, 2012.

Clausen, T., et al., "Optimized Link State Routing Protocol (OLSR)," Network Working Group, pp. 1-71, Oct. 2003.

Kindberg, Tim et al., "People, Places, Things: Web Presence for the Real World," Mobile Networks and Applications, vol. 7, No. 5, pp. 365-376, Oct. 2002.

Perkins, C., et al., "Ad hoc On-Demand Distance Vector (AODV) Routing," Network Working Group, pp. 1-35, Oct. 2003.

* cited by examiner

USER-BASED NETWORK ONBOARDING

CROSS-REFERENCE TO RELATED APPLICATIONS

This application is a continuation application of U.S. patent application Ser. No. 14/180,297, filed Feb. 13, 2014, which claims priority to U.S. Provisional No. 61/916,088, filed Dec. 13, 2013, both of which are incorporated herein by reference.

BACKGROUND

Computer networks play an important part of many information infrastructures. Computer networks typically allow devices to exchange data with one another. A computer network may include data connections to allow devices to provide data to one another. Networks links may couple points of the computer network through a variety of media, including wired media and wireless media. Computer networks continue to become faster and more reliable ways to transfer and share information. Organizations have come to rely on the speed and reliability of computer networks to provide members with the ability to exchange information, resources, and other items of interest with each other and with the outside world.

It is important to ensure network access secure and convenient for an organization's members and for the organization itself. For example, an organization may wish to ensure users only access the organization's network using devices that are sufficient secure. The organization may need to verify the security of devices of users brought to the organization's network. Similarly, the organization may need to verify the security of devices the organization has issued to users. Making sure security processes are not inconvenient for users has proven difficult.

SUMMARY

Figure 1:
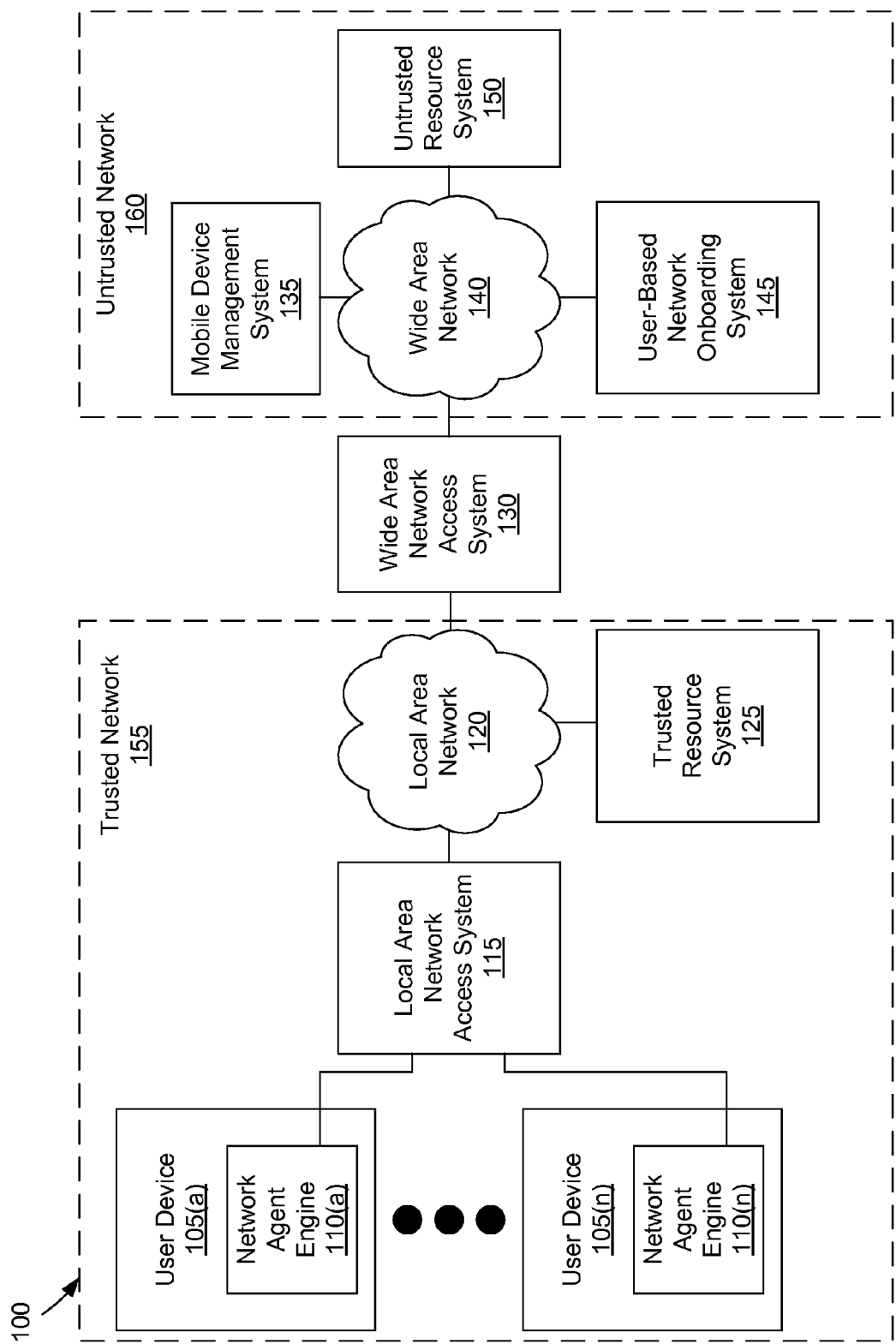
FIG. 1 shows an example of a user-based network onboarding environment, in accordance with an implementation.

Systems, methods, and non-transitory computer-readable media may allow users of a network access system to configure multiple devices to access a network using security profiles associated with the users and/or their devices. A first-level security profile may be assigned to a user. Second-level security profiles, each falling under the first-level security profile, may be assigned to devices associated with the user. The first-level security profile may include information related to the user's account, and the second-level security profiles may include configuration relevant to configuring each of the user's devices. The techniques described herein may be used in conjunction with web browsers, mobile device management (MDM) engines, and/or other systems and methods. In some implementations, third- or subsequent-levels of security profiles may be used as part of additional configuration options for various devices.

A system includes: a computer-readable medium; a first-level security profile engine coupled to the computer-readable medium; a second-level security profile engine coupled to the computer-readable medium; a device selection engine coupled to the computer-readable medium; and a device network configuration engine coupled to the computer-readable medium. In an implementation, the first-level security profile engine assigns a first-level security profile to a user of a user device, the user device requesting access to a network. The second-level security profile engine may assign a first second-level security profile to the first user device, the first second-level security profile providing first network configuration information for the first user device. In various implementations, the second-level security profile engine assigns a second second-level security profile to a second user device associated with the first-level security profile. The device network configuration engine may configure the first user device to access the network based on the first network configuration information.

In an implementation, the device network configuration engine configures the second user device to access the network based on the second network configuration information.

In an implementation, the system further comprises: a network access system management engine. The network access system management engine may maintain a web portal for accessing the network. The device selection engine may further include: a web portal request engine; a device listing engine; a listed device selection engine. In operation: the web portal request engine requests from the web portal a list of user devices to associate with the first-level security profile; the device listing engine receives from the web portal a listing of one or more user devices in response to the request for the list; the listed device selection engine receives a selection from the user of the second user device from the one or more listed user device.

In an implementation, the device selection engine comprises: a mobile device management (MDM) engine; a device listing engine; a listed device selection engine. In an implementation, the MDM engine requests from an MDM system a list of user devices to associate with the first-level security profile. The device listing engine may receive from the MDM system a listing of one or more user devices in response to the request for the list. The listed device selection engine may receive a selection from the user of the second user device from the one or more listed user device.

In some implementations, the first user device comprises a browser-based user device. Further, the system may further include: a device access notification engine; a browser extension engine; a network file connectivity transfer engine. In an implementation, the device access notification engine receives a notification of the access to the network by the first user device. The browser extension engine may provide, in response to the notification of the access, a browser extension to a web browser of the first user device. The network file connectivity transfer engine may provide a network connectivity file to the browser extension. In an implementation the device network configuration engine configures the first user device to access the network based at least in part on information in the network connectivity file. The web browser may comprise a native web browser of the browser-based user device.

In an implementation, the system further comprises a third-level security profile engine, wherein in operation the third-level security profile engine assigns a first third-level security profile to the first user device, the first third-level security profile providing first device configuration information for the first user device. In an implementation, the third-level security profile engine assigns a second third-level security profile to the second user device, the second third-level security profile providing second device configuration information for the second user device.

A method may include: assigning a first-level security profile to a user of a user device, the user device requesting access to a network; assigning a first second-level security profile to the first user device, the first second-level security profile providing first network configuration information for the first user device; assigning a second second-level security profile to a second user device that is associated with the first-level security profile, the second second-level security profile providing second network configuration information for the second user device; configuring the second user device to access the network based on the second network configuration information.

The method may further comprise configuring the second user device to access the network based on the second network configuration information. The method may further comprise: maintaining a web portal for accessing the network; requesting from the web portal a list of user devices to associate with the first-level security profile; receiving from the web portal a listing of one or more user devices in response to the request for the list; receiving a selection from the user of the second user device from the one or more listed user device.

The method may further comprise: requesting from a mobile device management (MDM) system a list of user devices to associate with the first-level security profile; receiving from the MDM system a listing of one or more user devices in response to the request for the list; receiving a selection from the user of the second user device from the one or more listed user device.

In an embodiment, the first user device comprises a browser-based user device. The method may further comprise: receiving a notification of the access to the network by the first user device; providing, in response to the notification of the access, a browser extension to a web browser of the first user device; providing a network connectivity file to the browser extension; configuring the first user device to access the network based at least in part on information in the network connectivity file. In an implementation, the web browser comprises a native web browser of the browser-based user device.

In an implementation, the method comprises assigning a first third-level security profile to the first user device, the first third-level security profile providing first device configuration information for the first user device. The method may comprise assigning a second third-level security profile to the second user device, the second third-level security profile providing second device configuration information for the second user device.

In an implementation, the method is executed by a processor of a user-based network onboarding system.

A non-transitory computer readable medium may comprise instructions, the instructions being executable by a processor to perform a method, the method comprising: assigning a first-level security profile for a user device, the user device requesting access to a network; assigning a first second-level security profile to the first user device, the first second-level security profile providing first network configuration information for the first user device; assigning a second second-level security profile to a second user device associated with the first-level security profile, the second second-level security profile providing second network configuration information for the second user device; configuring the second user device to access the network in accordance with the second network configuration information.

DETAILED DESCRIPTION

FIG. 1 shows an example of a user-based network onboarding environment 100, in accordance with an implementation. In the example of FIG. 1, the user-based network onboarding environment 100 includes user devices 105-1 through 105-N (user devices 105), a local area network (LAN) network access system 115, a LAN 120, a trusted resource system 125, a wide area network (WAN) access system 130, a mobile device management system 135, a wide area network 140, a user-based network onboarding system 145, and an untrusted resource system 150. In the example of FIG. 1, the user devices 105, the LAN network access system 115, the LAN 120, and the trusted resource system 125 reside within a trusted network 155. In this example, the mobile device management system 135, the WAN 140, the user-based network onboarding system 145, and the untrusted resource system 150 reside within an untrusted network 160.

In the example of FIG. 1, the user devices 105 are coupled to the LAN network access system 115. One or more of the user devices 105 can include a station. A "station," as used in this paper, may refer to a device with a media access control (MAC) address and a physical layer (PHY) interface to a wireless medium complying with the IEEE 802.11 standard. Thus, for example, stations and a wireless access point (WAP) with which the stations associate can be referred to as stations, if applicable. IEEE 802.11a-1999, IEEE 802.11b-1999, IEEE 802.11g-2003, IEEE 802.11-2007, and IEEE 802.11n TGn Draft 8.0 (2009) are incorporated by reference. A system that is 802.11 standards-compatible or 802.11 standards-compliant, as used in this paper, may comply with at least some of one or more of the incorporated documents' requirements and/or recommendations, or requirements and/or recommendations from earlier drafts of the documents, and includes Wi-Fi systems. Wi-Fi is a non-technical description, which is generally correlated with the IEEE 802.11 standards, as well as Wi-Fi Protected Access (WPA) and WPA2 security standards, and the Extensible Authentication Protocol (EAP) standard. In alternative implementations, a station may comply with a different standard than Wi-Fi or IEEE 802.11, may be referred to as something other than a "station," and may have different interfaces to a wireless or other medium.

In a specific implementation, the user devices 105 access resources provided through the LAN 120 and the LAN network access system 115. For instance, the user devices 105 can access the trusted resource system 125, described further herein, through the LAN 120 and the LAN network access system 115. In an implementation, the user devices 105 access resources through the WAN 140, LAN network access system 115, and/or the WAN access system 130. More specifically, the user devices 105 can access the untrusted resource system 150 through the WAN 140, LAN network access system 115, and/or the WAN access system 130.

In the example of FIG. 1, each of the user devices 105 include respective network agent engines 110-1 through 110-N (network agent engines 110). In a specific implementation, the network agent engines 110 are implemented as at least a portion of an application executing on the user devices 105. In another implementation, the network agent engines 110 are implemented as part (e.g., an extension, a plugin, etc.) of a network browser (e.g., an Internet browser). In yet another implementation, the network agent engines 110 are part of the operating system of the user devices 105. In an implementation, the network agent engines 110 can allow the user devices 105 to access network resources, such as the trusted resource system 125 and/or the untrusted resource system 150. The network agent engines 110 can allow the user devices 105 to display webpages or other graphical depictions of network resources, in various implementations.

In a particular implementation, the network agent engines 110 may include an "engine" and a "datastore," as discussed in this paper. An engine, as used in this paper, includes a dedicated or shared processor and, typically, firmware or software modules executed by the processor. Depending upon implementation-specific or other considerations, an engine can be centralized or its functionality distributed. An engine can include special purpose hardware, firmware, or software embodied in a computer-readable medium for execution by the processor.

A datastore, as used in this paper, can be implemented, for example, as software embodied in a physical computer-readable medium on a general- or specific-purpose machine, in firmware, in hardware, in a combination thereof, or in an applicable known or convenient device or system. Datastores in this paper are intended to include any organization of data, including tables, comma-separated values (CSV) files, traditional databases (e.g., SQL), or other applicable known or convenient organizational formats. Datastore-associated components, such as database interfaces, can be considered "part of" a datastore, part of some other system component, or a combination thereof, though the physical location and other characteristics of datastore-associated components is not critical for an understanding of the techniques described in this paper. Datastores can include data structures. As used in this paper, a data structure is associated with a particular way of storing and organizing data in a computer so it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures for creating and manipulating instances of that structure.

In a specific implementation, the network agent engines 110 control how the user devices 105 access network resources. More specifically, the network agent engines 110 can determine what resources the user devices 105 are allowed to access. For instance, the network agent engines 110 control whether the user devices 105 are allowed to access any of the trusted resource system 125 and/or the untrusted resource system 150. The network agent engines 110 can also control whether particular users of the user devices 105 are allowed to access portions of the trusted resource system 125 and/or the untrusted resource system 150.

In some implementations, the network agent engines 110 may implement other security techniques on the user devices 105. For example, in an implementation, the network agent engines 110 makes sure the user devices 105 are adequately protected from unauthorized users or unauthorized usages. That is, in this implementation, the network agent engines 110 require the user devices 105 to be protected by password, biometric authentication techniques, or other techniques. As another example, the network agent engines 110 may make sure the user devices 105 cannot access specific websites (e.g., blacklisted websites) or can access only specific websites (e.g., whitelisted websites). As yet another example, the network agent engines 110 may limit the types of applications the user devices 105 are allowed to install and/or execute. More specifically, the network agent engines 110 may not allow the user devices 105 to install and/or execute blacklisted applications, or may allow the user devices 105 to only install and/or execute whitelisted applications. The network agent engines 110 may or may not implement features of a mobile device management (MDM) policy not enumerated herein.

In the example of FIG. 1, the LAN network access system 115 is coupled to the user devices 105 and the LAN 120. In an implementation, the LAN network access system 115 is coupled to each of the network agent engines 110 in the user devices 105. The LAN network access system 115 can provide, in various implementations, access to the LAN 120 and/or the WAN 140. In an implementation, the LAN network access system 115 can be implemented as one or more of a network access point, a gateway, a switch, a router, and a bridge. In some implementations, the LAN network access system 115 is implemented as: a wireless network access point to supply wireless network access to the LAN 120 and/or the WAN 140; and/or a wired access point to supply wired network access to the LAN 120 and/or the WAN 140. In some implementations, the LAN network access system 115 is administered by the user-based network onboarding system 145. In various implementations, the LAN network access system 115 may receive instructions from the user-based network onboarding system 145 to onboard more than one of the user devices 105, as discussed further in this paper to the trusted resource system 125 and/or the untrusted resource system 150.

In specific implementations, the LAN network access system 115, the mobile device management system 135, the user-based network onboarding system 145, or some combination thereof, controls the MDM policy. In an implementation in which updates are available, the MDM policy can be configured, for example, to manually update, to update at a predetermined interval, such as periodically, or to update in some other fashion. For example, the MDM policy can be configured to update at the request of an administrator of the user-based network onboarding system 145. In a specific implementation, the network agent engines 110 receive instructions from the user-based network onboarding system 145 to onboard the user devices 105 to network resources, as discussed in this paper.

In the example of FIG. 1, the LAN 120 is coupled to the LAN network access system 115, the trusted resource system 125, and the WAN access system 130. In a specific implementation, the LAN 120 may provide a network linking the user devices 105 to each other, to the trusted resource system 125, and/or to the WAN 140. In some implementations, the LAN 120 is administered by the network administrator who is associated with the user-based network onboarding system 145 and/or is charged with administering network and other policies for the trusted resource system 125.

In a specific implementation, the LAN 120 includes a wired network using wires for at least some communications. In some implementations, the LAN 120 comprises a wireless network. A "wireless network," as used in this paper may include any computer network communicating at least in part without the use of electrical wires. In various implementations, the LAN 120 includes technologies such as Ethernet, 802.11, worldwide interoperability for microwave access (WiMAX), 3G, 4G, CDMA, GSM, LTE, digital subscriber line (DSL), etc. The LAN 120 can further include networking protocols such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the LAN 120 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In a specific implementation, the wireless network of the LAN 120 is compatible with the 802.11 protocols specified by the Institute of Electrical and Electronics Engineers (IEEE). The LAN 120 may be compatible with one or more stations, such as the user devices 105, discussed herein.

In a specific implementation, the wireless network of the LAN 120 is compatible with the 802.3 protocols specified by the IEEE. In some implementations, IEEE 802.3 compatible protocols of the LAN 120 may include local area network technology with some wide area network applications. Physical connections are typically made between nodes and/or infrastructure devices (hubs, switches, routers) by various types of copper or fiber cable. The IEEE 802.3 compatible technology can support the IEEE 802.1 network architecture of the LAN 120. These standards provide the basis for wireless network products using the Wi-Fi brand. IEEE 802.1 and 802.3 are incorporated by reference.

In the example of FIG. 1, the trusted resource system 125 is coupled to the LAN 120. In a specific implementation, the trusted resource system 125 may include one or more engines and/or datastore containing trusted resources. "Trusted resources," as discussed herein, may refer to any network resources that are available to non-administrative users of the LAN 120 but not to non-administrative users of the WAN 140. Trusted resources can include network resources that are protected by security protocols of the trusted network 155. Trusted resources can include any resources protected by the functionalities of the WAN access system 130. In various implementations, the trusted resource system 125 provides access portions of private networks, enterprise networks, virtual public networks (VPNs), etc. In an implementation, the trusted resource system 125 is administered by the same administrative entity administering the user-based network onboarding system 145. Examples of trusted resources include websites, databases, applications, content, etc. on an Intranet within the trusted network 155.

In the example of FIG. 1, the WAN access system 130 is coupled to the LAN 120 and the WAN 140. In a specific implementation, the WAN access system 130 couples the portions of the trusted network 155 to the portions of the untrusted network 160. More specifically, the WAN access system 130 can couple the LAN 120 to the WAN 140. This can have the effect of coupling the user devices 105, the LAN network access system 115, and the trusted resource system 125 to the mobile device management system 135, the untrusted resource system 150, and the user-based network onboarding system 145. In various implementations, the WAN access system 130 is implemented as one or more of a gateway, a switch, a router, and a bridge providing access to the WAN 140. In some implementations, the WAN access system 130 is administered by the network administrator who is associated with the user-based network onboarding system 145 and/or is charged with administering network and other policies for the trusted network 155.

Though FIG. 1 shows the LAN network access system 115 as distinct from the WAN access system 130, in various implementations, the functionalities of the LAN network access system 115 and the WAN access system 130 may be interchanged or consolidated into a single system. More specifically, in some implementations, the LAN network access system 115 provides direct access to the WAN 140. In these implementations, the LAN network access system 115 can nonetheless be associated with the trusted network 155 and administered by the network administrator who is associated with the user-based network onboarding system 145 and/or is charged with administering network and other policies for the trusted network 155.

In the example of FIG. 1, the mobile device management system 135 is coupled to the WAN 140. In a specific implementation, the mobile device management system 135 provides mobile device management services for the user devices 105. More specifically, the mobile device management system 135 can interface with the network agent engines 110 to control how the user devices 105 access network resources. In some implementations, the mobile device management system 135 determines what resources the user devices 105 are allowed to access (e.g., the trusted resource system 125, the untrusted resource system 150, portions of the LAN 120, portions of the WAN 140, etc.). In these implementations, the mobile device management system 135 further configures the network agent engines 110 to provide or deny access to these resources.

In a particular implementation, the mobile device management system 135 controls other security features of the network agent engines 110. For example, the mobile device management system 135 can control whether the user devices 105 are to be password protected, biometrically authenticated, etc., before the user devices 105 are allowed to have access to resources. The mobile device management system 135 may determine specific blacklisted or whitelisted websites and/or applications the user devices 105 are or are not allowed to have access to. The mobile device management system 135 may further determine the types of applications and the specific applications the user devices 105 are or are not allowed to install and/or execute. In an implementation, the mobile device management system 135 may control other parts of an MDM policy not provided for herein. In various embodiments, the mobile device management system 135 may provide updates to the MDM policy at various intervals, such as periodically, at the request of an administrator, or manually.

In the example of FIG. 1, the WAN 140 is coupled to the WAN access system 130, the mobile device management system 135, the untrusted resource system 150, and the user-based network onboarding system 145. In a specific implementation, the WAN 140 includes a networked system including several computer systems coupled together, such as the Internet, or a device for coupling components of a single computer, such as a bus. The term "Internet" as used in this paper refers to a network of networks using certain protocols, such as the TCP/IP protocol, and possibly other protocols such as the hypertext transfer protocol (HTTP) for hypertext markup language (HTML) documents making up the World Wide Web (the web). Content is often provided by content servers, which are referred to as being "on" the Internet. A web server, which is one type of content server, is typically at least one computer system which operates as a server computer system and is configured to operate with the protocols of the web and is coupled to the Internet. The physical connections of the Internet and the protocols and communication procedures of the Internet and the web are well known to those of skill in the relevant art. For illustrative purposes, it is assumed the WAN 140 broadly includes, as understood from relevant context, anything from a minimalist coupling of the components illustrated in the example of FIG. 1, to every component of the Internet and networks coupled to the Internet. In some implementations, the WAN 140 is administered by a service provider, such as an Internet Service Provider (ISP).

In various implementations, the WAN 140 may include technologies such as Ethernet, 802.11, worldwide interoperability for microwave access (WiMAX), 3G, 4G, CDMA, GSM, LTE, digital subscriber line (DSL), etc. The WAN 140 may further include networking protocols such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the WAN 140 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In the example of FIG. 1, the user-based network onboarding system 145 is coupled to the WAN 140. In a specific implementation, the user-based network onboarding system 145 authenticates access of the user devices 105 to network resources. As examples, the user-based network onboarding system 145 can authenticate access of the user devices 105 to the trusted resource system 125 and/or the untrusted resource system 150.

In an implementation, the user-based network onboarding system 145 performs onboarding and/or offboarding of the user devices 105. "Onboarding," as used in this paper, may refer to adding new devices to access network resources. The onboarding performed by the user-based network onboarding system 145 may include verifying the user devices 105 are sufficiently secured and/or compliant with requirements of the mobile device management system 135 to access the trusted resource system 125, the untrusted resource system 150 through the LAN network access system 115 and/or the WAN access system 130. "Offboarding," as used in this paper, may refer to removing devices from the set of devices allowed to access the network resources.

In a specific implementation, the user-based network onboarding system 145 performs user-based onboarding. More specifically, the user-based network onboarding system 145 can maintain a web portal, such as a walled garden environment where users onboard their own devices. In an implementation, the user devices 105 can be redirected to the walled garden environment whenever the user devices 105 access the LAN access system 115. The walled garden environment can then verify whether the user devices 105 were previously or should in the future be onboarded to access network resources. In an implementation, the user-based network onboarding system 145 can onboard a first user device associated with a user (e.g., the user device 105-1) and can create a first-level security profile for the user based on information supplied by the user. A first-level security profile, as used, herein, may refer to information used to identify the user. Though this paper uses the term "user" in conjunction with the first-level security profile, it is noted that the first-level security profile may identify, in various implementations, a person, a group of people, a subscriber station of the LAN 120, a group of subscriber stations of the LAN 120, etc.

In an implementation, the user-based network onboarding system 145 identifies other devices associated with the user. For example, the user can enter the identities of other devices (e.g., the user's own devices brought into the user-based network onboarding environment 100 for use) into the web portal. As another example, the user-based network onboarding system 145 can automatically find all devices (e.g., company issued devices) associated with the user. The user-based network onboarding system 145 may assign second-level security profiles for each of the user's devices (e.g., the user devices 105). A second-level security profile, as used herein, may refer to information used to identify one of the user devices 105. The second-level security profile may also identify other attributes of the one of the user devices 105. For instance, the second-level security profile may include device information (e.g., hardware configurations, software configurations, etc.), network information (e.g., network configurations), and other information about one of the user devices 105. In an implementation, each of the second-level security profiles may provide network configuration information so that the user devices 105 can be onboarded to the trusted resource system 125 and/or the untrusted resource system 150. The user-based network onboarding system 145 can also assign other levels of security profiles (e.g., third-level security profiles, fourth-level security profiles, etc.) as required to onboard the user devices 105. In an implementation, the onboarding by the user-based network onboarding system 145 is performed on a browser-based device. The user-based network onboarding system 145, and the engines therein, are further discussed in the context of FIGS. 2-10.

In the example of FIG. 1, the untrusted resource system 150 is coupled to the WAN 140. In a specific implementation, the untrusted resource system 150 may include one or more engines and/or datastore containing untrusted resources. "Untrusted resources," as discussed herein, may refer to any network resources that are generally available to users of the WAN 140 and are not protected by security protocols of the trusted network 155. Examples of untrusted resources include websites, databases, applications, content, etc. that a user can navigate to using the Internet.

Figure 2:
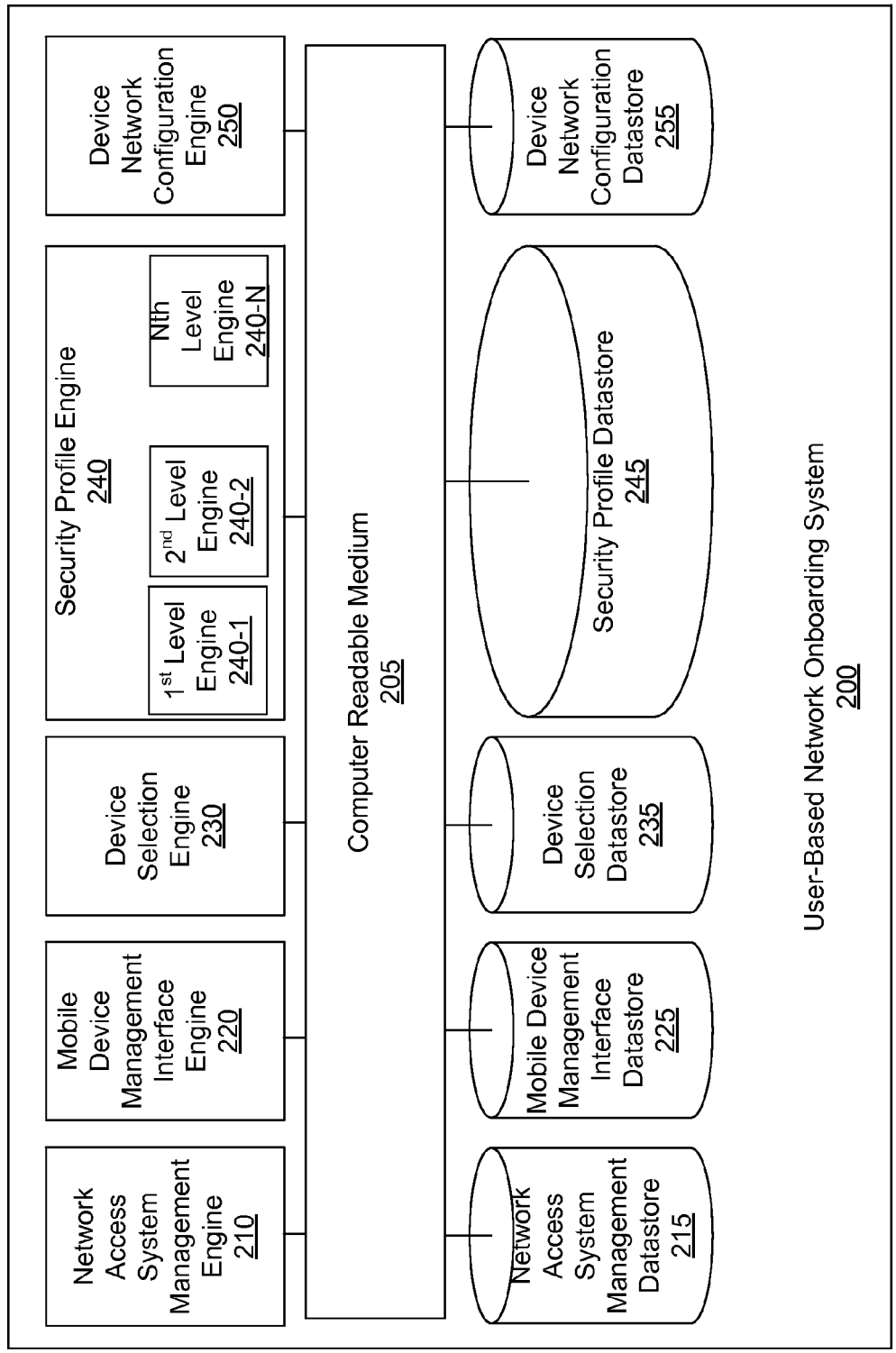
FIG. 2 shows a user-based network onboarding system, in accordance with an implementation, in accordance with an implementation.

FIG. 2 shows a user-based network onboarding system 200, in accordance with an implementation. In the example of FIG. 2, the user-based network onboarding system 200 includes a network access system management engine 210, a network access system management datastore 215, a mobile device management interface engine 220, a mobile device management interface datastore 225, a device selection engine 230, a device selection datastore 235, a security profile engine 240, a security profile datastore 245, a device network configuration engine 250, and a device network configuration datastore 255.

In a specific implementation, one or more of the network access system management engine 210, the network access system management datastore 215, the mobile device management interface engine 220, the mobile device management interface datastore 225, the device selection engine 230, the device selection datastore 235, the security profile engine 240, the security profile datastore 245, the device network configuration engine 250, and the device network configuration datastore 255 includes an "engine," as discussed herein. In a specific implementation, one or more of the network access system management engine 210, the network access system management datastore 215, the mobile device management interface engine 220, the mobile device management interface datastore 225, the device selection engine 230, the device selection datastore 235, the security profile engine 240, the security profile datastore 245, the device network configuration engine 250, and the device network configuration datastore 255 includes a "datastore," as discussed herein.

In the example of FIG. 2, the computer-readable medium 205 is coupled to the network access system management engine 210, the network access system management datastore 215, the mobile device management interface engine 220, the mobile device management interface datastore 225, the device selection engine 230, the device selection datastore 235, the security profile engine 240, the security profile datastore 245, the device network configuration engine 250, and the device network configuration datastore 255. In various implementations, the computer-readable medium 205 includes a coupling system that comprises anything from a device for coupling together components of a single computer, such as a bus, to a networked system that includes several computer systems coupled together, such as the Internet. It is noted the computer-readable medium 205 can broadly include, as understood from relevant context, anything from a minimalist coupling of the components illustrated in the example of FIG. 2, to every component of the Internet and networks coupled to the Internet.

In the example of FIG. 2, the network access system management engine 210 is coupled to the computer-readable medium 205. In a specific implementation, the network access system management engine 210 manages the network access systems, such as the LAN access system 115 and/or the WAN access system 130 (shown in FIG. 1). More specifically, the network access system management engine 210 may implement instructions from an administrator to control network access systems, and/or to implement network policies associated with the network access systems. In an implementation, the network access system management engine 210 maintains a web portal for network access. The network access system management engine 210 may further maintain a walled garden environment associated with the web portal. In various implementations, the network access system management engine 210 instructs network access systems to permit or deny network access to specific user devices. In an implementation, the network access system management engine 210 determines the identity of specific users and/or specific user devices trying to access network resources.

In the example of FIG. 2, the network access system management datastore 215 is coupled to the computer-readable medium 205. In an implementation, the network access system management datastore 215 stores information associated with the network access system management engine 210.

In the example of FIG. 2, the mobile device management interface engine 220 is coupled to the computer-readable medium 205. In a specific implementation, the mobile device management interface engine 220 interfaces with mobile device management system(s). In an implementation, the mobile device management interface engine 220 can further instruct the network access system management engine 210 to ensure user devices are adequately protected by any MDM policies received from mobile device management system(s). The mobile device management interface engine 220 can also instruct the network access system management engine 210 to check for updated MDM policies at an interval, such as periodically, or at the request of an administrator. In the example of FIG. 2, the mobile device management interface datastore 225 is coupled to the computer-readable medium 205. In an implementation, the mobile device management interface datastore 225 stores information associated with the mobile device management interface engine 220.

In the example of FIG. 2, the device selection engine 230 is coupled to the computer-readable medium 205. In an implementation, the device selection engine 230 selects user devices to assign security profiles to. In a particular implementation, the device selection engine 230 selects user devices based on input into the web portal provided by the network access system management engine 210. An example of such an implementation is provided in FIG. 4. In an implementation, the device selection engine 230 selects user devices based on a list of issued user devices that are known to be associated with the user. An example of such an implementation is provided in FIG. 5. In the example of FIG. 2, the device selection datastore 235 is coupled to the computer-readable medium 205. In an implementation, the device selection datastore 235 stores information associated with the device selection engine 230.

In the example of FIG. 2, the security profile engine 240 is coupled to the computer-readable medium 205. In an implementation, the security profile engine 240 assigns security profiles to users and/or user devices. In an implementation, the security profile engine 240 includes a first level engine 240-1, a second level engine 240-2, through an N-th level engine 240-N. It is noted that the letter N designates an arbitrary number and need not be related to the letter "N" used to designate the number of devices in FIG. 1. The first level engine 240-1 can implement a first-level security profile for a user. The second level engine 240-2 can implement a second-level security profile for the user. In an implementation, the second-level profile can be associated with specific devices of the user. The N-th level engine 240-N can implement an N-th level security profile for the user. In various embodiments, the N-th-level profile can correspond to attributes of a particular device, such as the device's operating system, software configuration, hardware configuration, network configuration, etc. In a certain implementation, any of the security profiles may be based on mobile device management information obtained through the mobile device management interface engine 220.

In the example of FIG. 2, the security profile datastore 245 is coupled to the computer-readable medium 205. In an implementation, the security profile datastore 245 stores information associated with the security profile engine 240. More specifically, in various implementations, the security profile datastore 245 stores security profiles for the security profile engine 240.

Figure 8:
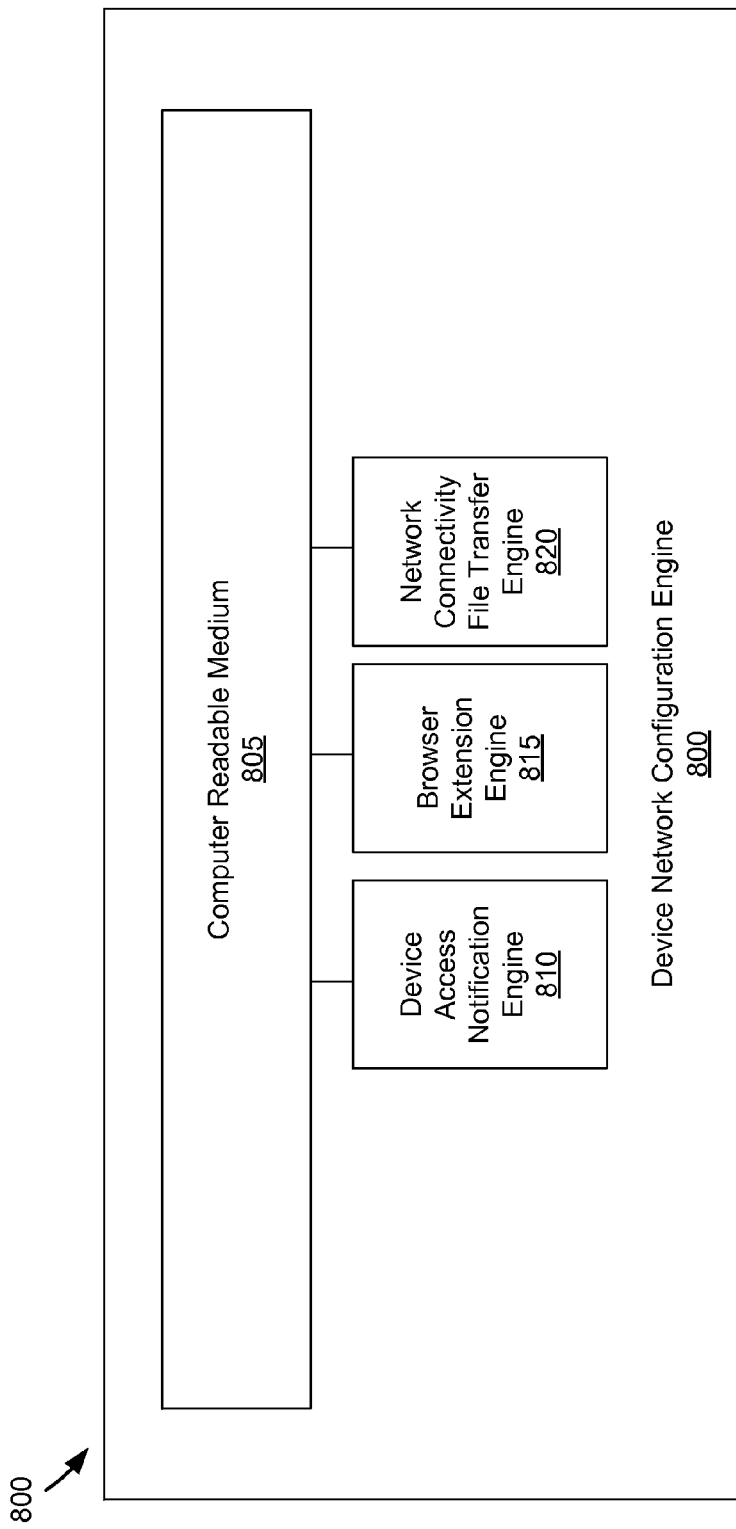
FIG. 8 shows an example of a device network configuration engine, in accordance with an implementation.

In the example of FIG. 2, the device network configuration engine 250 is coupled to the computer-readable medium. In a specific implementation, the device network configuration engine 250 configures particular user devices for access to network resources. In an implementation, the configuration of user devices may be based on security profiles from the security profile engine 240. In an implementation, the device network configuration engine 250 can configure user devices based on second-level security profiles associated with the user devices. In a particular implementation, the device network configuration engine 250 configures a browser-based device. An example of such an implementation is shown in FIG. 8. In the example of FIG. 2, the device network configuration datastore 255 is coupled to the computer-readable medium. In an implementation the device network configuration datastore 255 stores information associated with the device network configuration engine 250.

Figure 3:
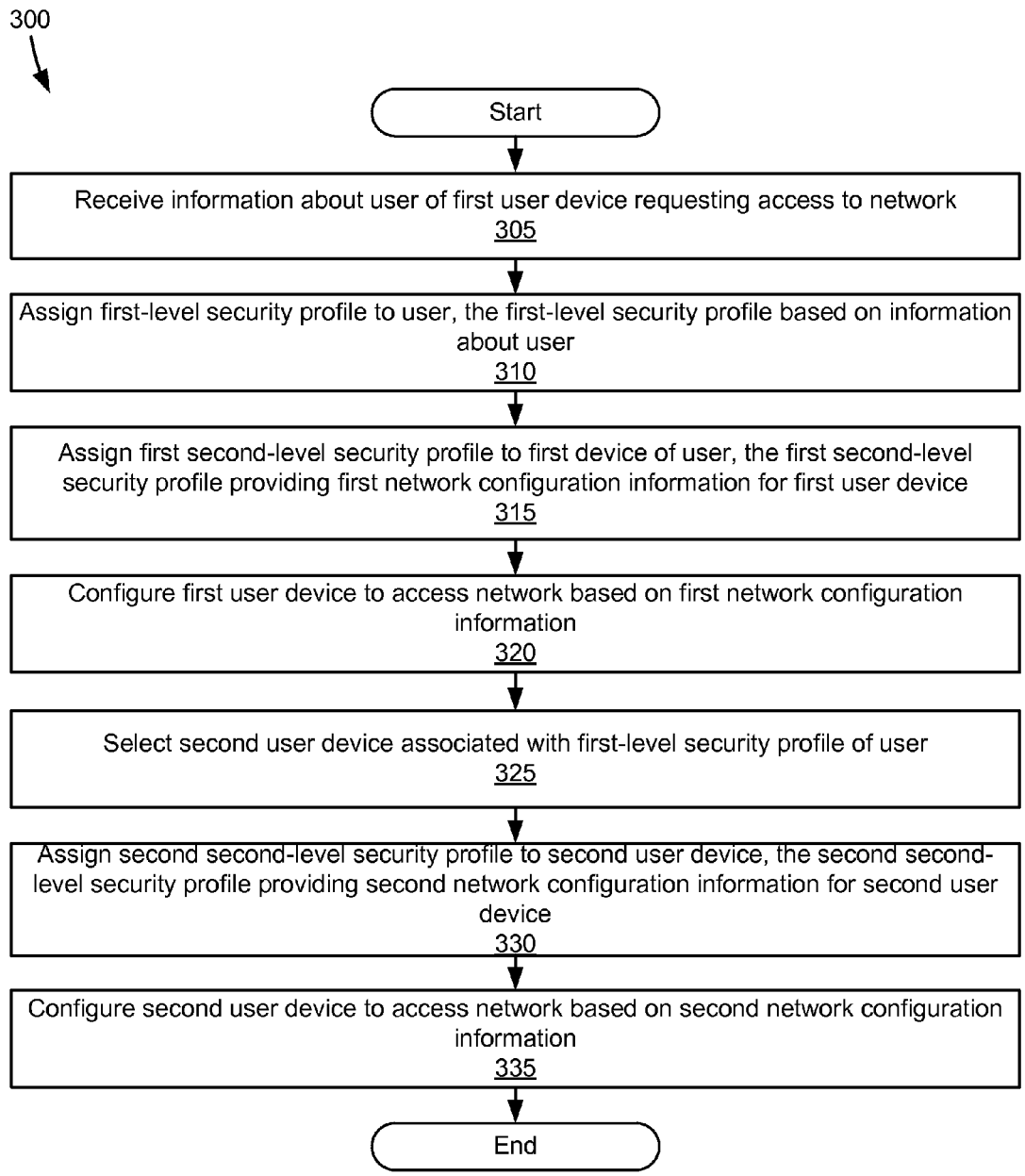
FIG. 3 shows an example of a flowchart of a method for performing user-based network onboarding of user devices, in accordance with an implementation.

FIG. 3 shows an example of a flowchart of a method 300 for performing user-based network onboarding of user devices, in accordance with an implementation. The method 300 is discussed in conjunction with the user-based network onboarding system 200, shown in FIG. 2. The modules 305-335 are merely examples of modules in the method 300, and it is noted in some implementations the method 300 is executed with less modules, more modules, or different modules than the modules specifically shown in FIG. 3.

At module 305, information is received about a user of a first device requesting access to a network. In an implementation, the network access system management engine 210 may receive information about a user of a first device requesting access to a network. The network access system management engine 210 may receive a notification from a network access system (e.g., the LAN access system 115 and/or the WAN access system 130 shown in FIG. 1) a user is seeking access to network resources (e.g., the trusted resource system 125 and/or the untrusted resource system 150 shown in FIG. 1).

More specifically, in an implementation, a user may enter the trusted network 155 (shown in FIG. 1) and seek network access. In such a case, the user may be redirected to a walled garden hosted by a web portal provided by the network access system management engine 210. The walled garden may capture the device identifier of the user device. If the user device is associated with a known user, the information about the known user may be provided. If the user device is not associated with a known user, the network access system management engine 210 may limit network access to the walled garden until the information of the user has been provided. In an implementation, the network access system management engine 210 provides the information about the user to the other engines of the user-based network onboarding system 200.

At module 310, a first-level security profile based at least in part on the information about the user is assigned to the user. In an implementation, the first level engine 240-1 assigns a first-level security profile to the user. The first-level security profile may contain information about the user, such as the user's network login credentials, the user's email address, the user's role (e.g., as an employee, a contractor, a guest, etc.) in the organization administering the trusted network, and other information about the user. In an implementation, the first level engine 240-1 may store the first-level profile in the security profile datastore 245 in an entry associated with the user.

At module 315, a first second-level profile is assigned to a first user device of the user. The first second-level profile may provide first network configuration information for the first user device. In an implementation, the second level engine 240-2 may assign a first second-level security profile for the first device. The first second-level security profile may provide information about how the first user device is to be configured in order to access the network. In an implementation, the first second-level security profile may require the first user device to be compliant with mobile device management policies for the network. For instance, the first second-level security profile may require the first user device to be protected by password and/or biometric authentication techniques, have an updated blacklist and/or whitelist of applications and/or websites, and other protection techniques. The first second-level profile may further provide configuration parameters for the first user device to access the network.

Figure 10:
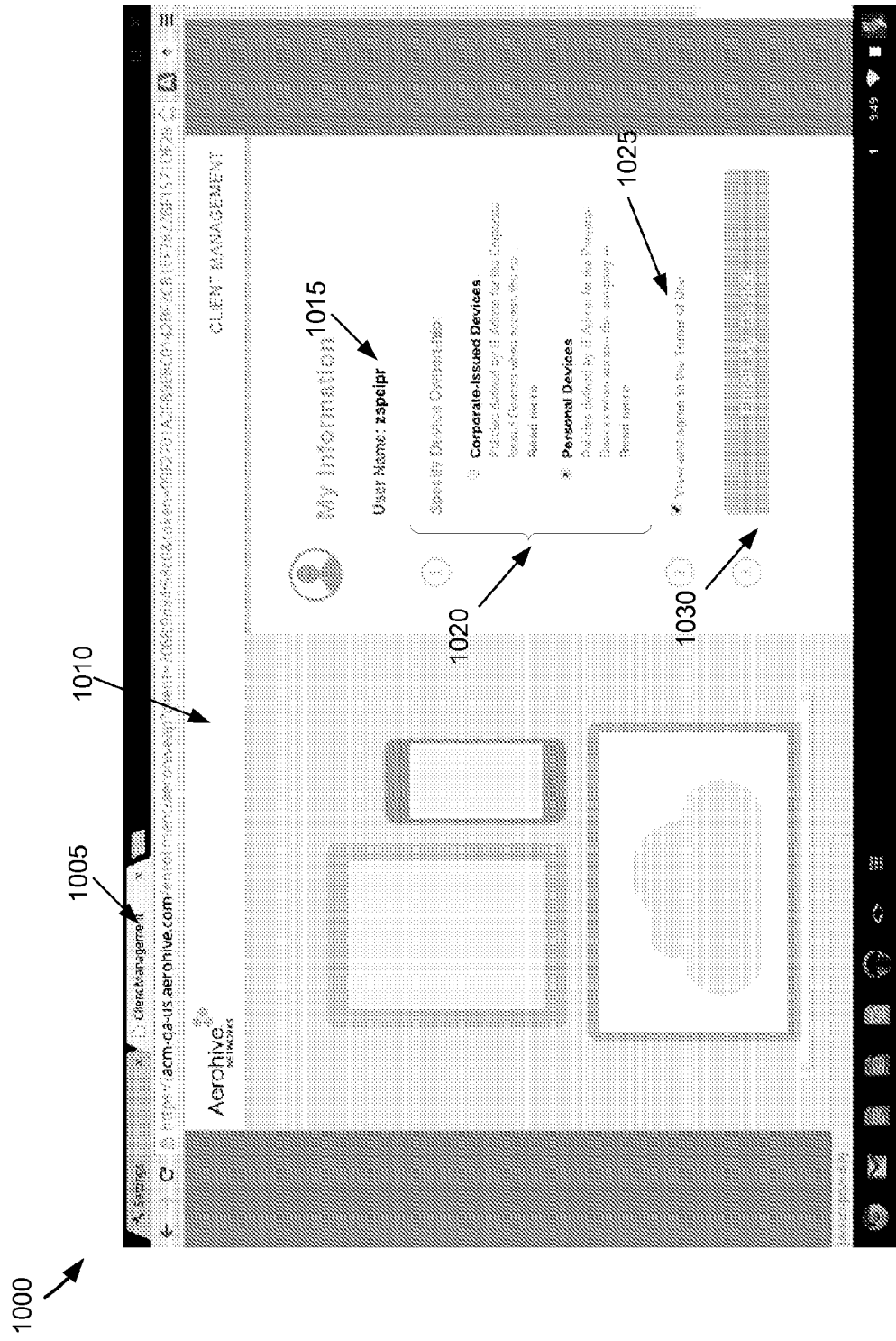
FIG. 10 shows an example of a screen for selecting a device for network authentication, in accordance with an implementation.

At module 320, the first user device is configured to access the network based on the first network configuration information. In an implementation, the device network configuration engine 250 can configure the first user device for network access. In some implementations, the device network configuration engine 250 allows the first device to access trusted resources (e.g., the trusted resource system 125 shown in FIG. 1). In various implementations, the device network configuration engine 250 allows the first device to access untrusted resources (e.g., the untrusted resource system 150 shown in FIG. 1). In an implementation, the first user device comprises a browser-based device, and the device network configuration engine 250 configures the first user device in accordance with a browser-based network configuration technique, an example of which is shown in FIG. 10.

At module 325, a second user device associated with the first-level security profile of the user is selected. In an implementation, the device selection engine 230 provides an identifier of a second user device associated with the first-level security profile. In some implementations, the device selection engine 230 may select the second device based on information the user has input into the web portal. In various implementations, the device selection engine 230 may select the second device from a list of user devices already known to be associated with the first-level security profile. For instance, the device selection engine 230 may select the second device from a list of user devices issued to the user by a company affiliated with the user.

At module 330, a second second-level security profile is assigned to the second user device, where the second second-level security profile provides second network configuration information for the second device. In an implementation, the second level engine 240-2 may assign a second second-level security profile for the second device. The second second-level security profile may provide information about how the second user device is to be configured in order to access the network. In an implementation, the second second-level security profile may require the second user device to be compliant with mobile device management policies for the network. For instance, the second second-level security profile may require the second user device to be protected by password and/or biometric authentication techniques, have an updated blacklist and/or whitelist of applications and/or websites, and other protection techniques. The second second-level profile may further provide configuration parameters for the second user device to access the network. In an implementation, the second user device comprises a browser-based device, and the device network configuration engine 250 configures the second user device in accordance with a browser-based network configuration technique, an example of which is shown in FIG. 10.

It is noted that while the method 300 shows onboarding only two devices for illustrative simplicity, various implementations provide for onboarding an arbitrary number of user devices for a user. As a result, the modules 325, 330, and 335 may be repeated an arbitrary number of times for other user devices. It is also noted that while the method 300 shows only two levels of security profiles being assigned to user devices, in various implementations, an arbitrary number of levels of security profiles may be applied to onboard devices to the network.

Figure 4:
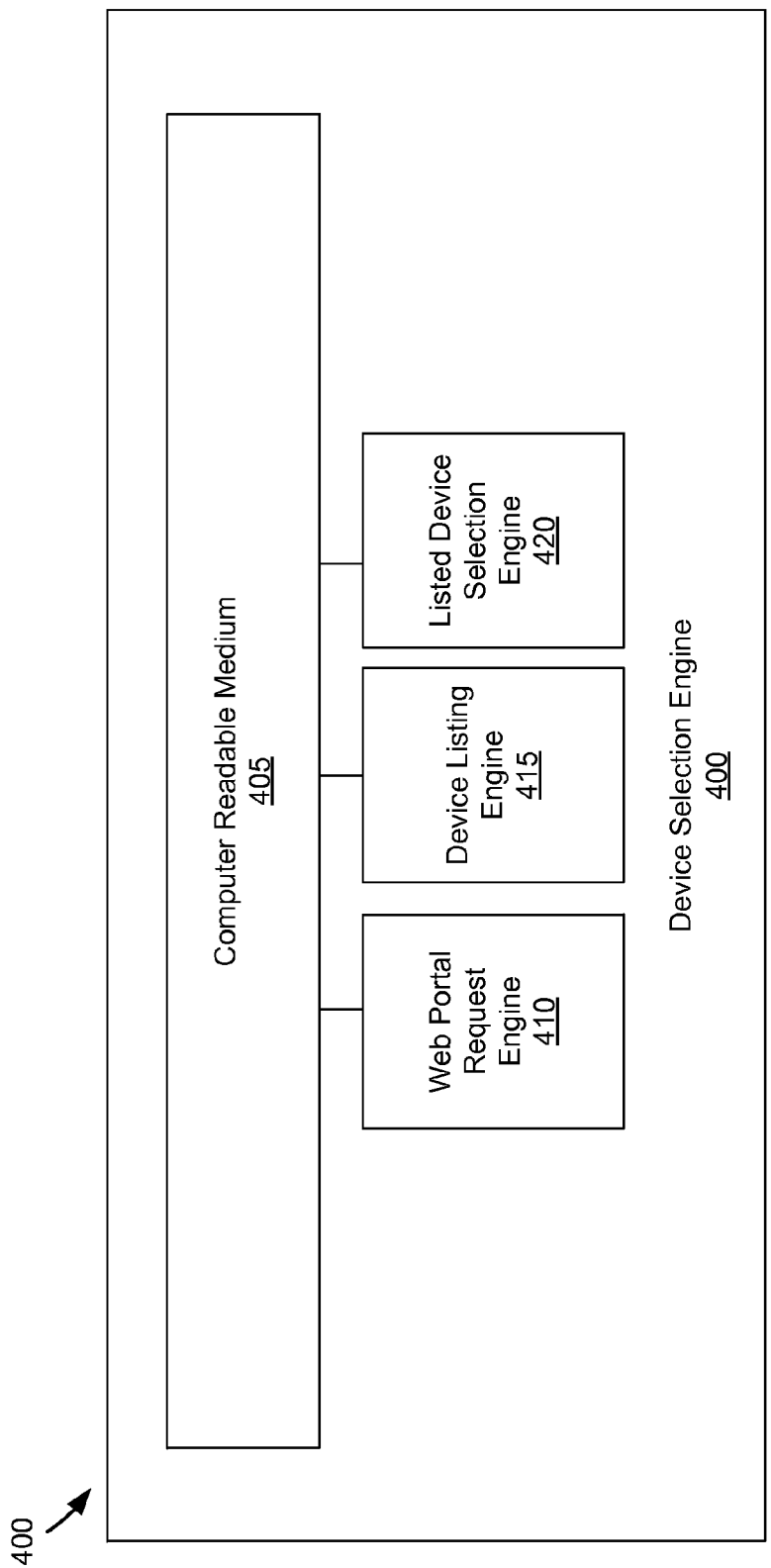
FIG. 4 shows an example of a device identification engine, in accordance with an implementation.

FIG. 4 shows an example of a device selection engine 400, in accordance with an implementation. In the example of FIG. 4, the device selection engine 400 includes a computer-readable medium 405, a web portal request engine 410, a device listing engine 415, and a listed device selection engine 420. In a specific implementation, one or more of the web portal request engine 410, the device listing engine 415, and the listed device selection engine 420 includes an "engine," as discussed herein.

In the example of FIG. 4, the computer-readable medium 405 is coupled to the web portal request engine 410, the device listing engine 415, and the listed device selection engine 420. In a specific implementation, the computer-readable medium 405 may include a "computer-readable medium," as defined in this paper.

In the example of FIG. 4, the web portal request engine 410 is coupled to the computer-readable medium 405. In an implementation, the web portal request engine 410 may provide instructions to a web portal (e.g., the web portal managed by the network access system management engine 210) to request a list of user devices associated with a user. The web portal request engine 410 may, in an implementation, provide a webpage to the web portal. The webpage may request a user list his or her user devices.

In the example of FIG. 4, the device listing engine 415 is coupled to the computer-readable medium 405. In a specific implementation, the device listing engine 415 may list the user devices of a user. The device listing engine 415 may accept a user's manual input regarding identifiers of user devices associated with the user. In an implementation, the device listing engine 415 may pre-populate the list of user devices with identifiers of devices known to be associated with the user (e.g., devices the user has previously onboarded and/or offboarded from the network). For instance, the device listing engine 415 may pre-populate the list of user devices with identifiers of devices known to correspond to the user's first-level security profile.

In the example of FIG. 4, the listed device selection engine 420 is coupled to the computer-readable medium 405. In an implementation, the listed device selection engine 420 may facilitate selection of listed user devices. For instance, the listed device selection engine 420 may allow the user to select particular user devices the user wishes to onboard to network resources.

Figure 5:
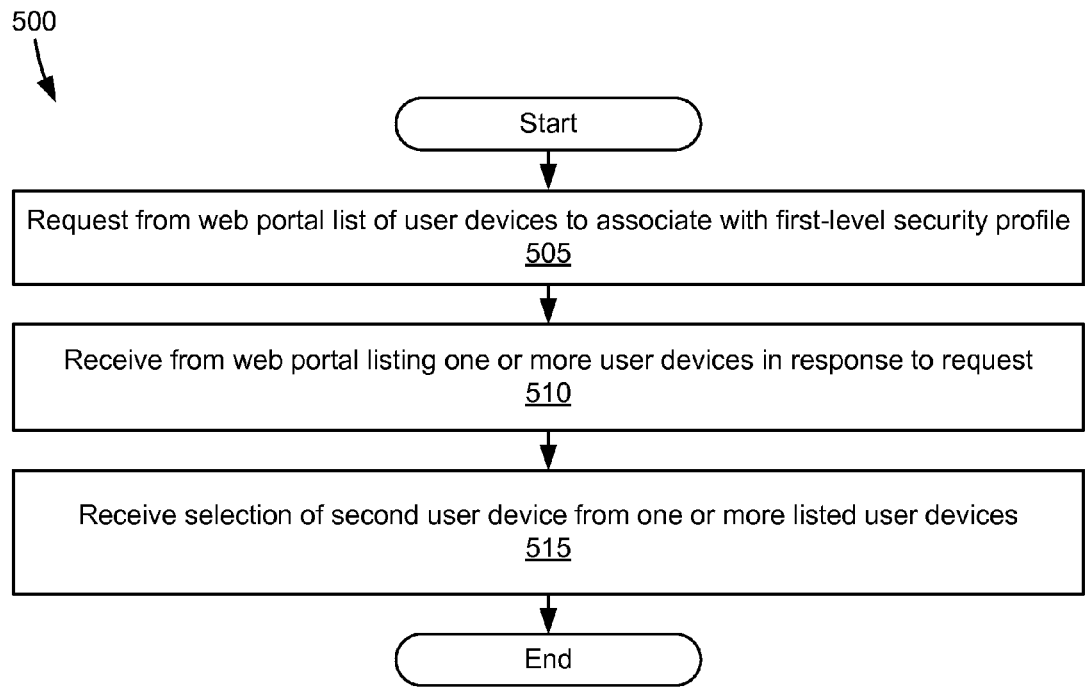
FIG. 5 shows an example of a flowchart of a method for selecting a device for network onboarding, in accordance with an implementation.

FIG. 5 shows an example of a flowchart of a method 500 for selecting a device for network onboarding, in accordance with an implementation. The method 500 is discussed in conjunction with the device selection engine 400, shown in FIG. 4. The modules 505-515 are merely examples of modules in the method 500, and it is noted in some implementations the method 500 is executed with less modules, more modules, or different modules than the modules specifically shown in FIG. 5.

At module 505, a list of user devices to associate with a first-level security policy is requested from a web portal. In a specific implementation, the web portal request engine 410 requests a list of user devices from a web portal (e.g., the web portal managed by the network access system management engine 210).

At block 510, a listing of one or more user devices is received in response to the request. In a specific implementation, the device listing engine 415 receives a listing of one or more user devices in response to the request from the web portal request engine 410. The device listing engine 415 may display the listing of the one or more user devices in the web portal. listing of user devices may, in an implementation, include user devices the user has manually entered the information of The listing of user devices may, in some implementations, include user devices that known to correspond to the user's first-level security profile.

At block 515, a selection of the second device from the one or more of the listed user devices is received. In an implementation, the listed device selection engine 420 receives the selection of the second user device. In various implementations, the second device is selected from the webpage displayed on the web portal. It is noted that while the method 500 shows selecting only a second device for illustrative simplicity, various implementations provide for selecting an arbitrary number of user devices for a user. As a result, the module 515 may be repeated an arbitrary number of times for other user devices in various implementations.

Figure 6:
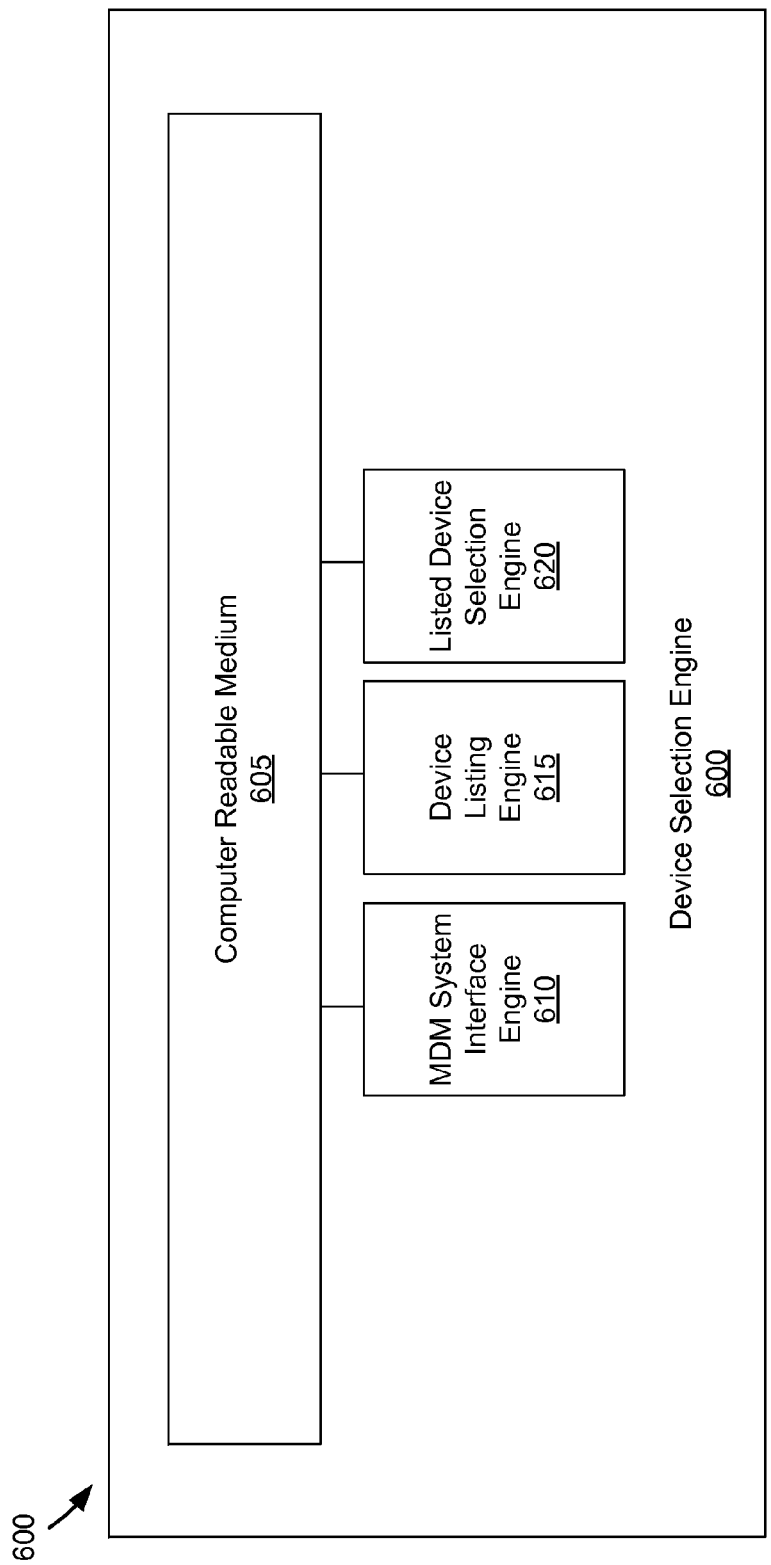
FIG. 6 shows an example of a device identification engine, in accordance with an implementation.

FIG. 6 shows an example of a device selection engine 600, in accordance with an implementation. In the example of FIG. 6, the device selection engine 600 includes a computer-readable medium 605, an MDM system interface engine 610, a device listing engine 615, and a listed device selection engine 620. In a specific implementation, one or more of the MDM system interface engine 610, the device listing engine 615, and the listed device selection engine 620 includes an "engine," as discussed herein.

In the example of FIG. 6, the computer-readable medium 605 is coupled to the MDM system interface engine 610, the device listing engine 615, and the listed device selection engine 620. In a specific implementation, the computer-readable medium 605 may include a "computer-readable medium," as defined in this paper.

In the example of FIG. 6, the MDM system interface engine 610 is coupled to the computer-readable medium 605. In an implementation, the MDM system interface engine 610 may request from an MDM system (e.g., mobile device management system 135 in FIG. 1), a list of user devices associated with the user. For instance, in an implementation, the MDM system interface engine 610 may request from the MDM system a list of user devices that were issued to the user. The MDM system may return to the MDM system interface engine 610 all devices issued to the user by an entity, such as the company the user is associated with. In an embodiment, the MDM system interface engine 610 may provide the list of user devices to a web portal (e.g., the web portal managed by the network access system management engine 210 in FIG. 2).

In the example of FIG. 6, the device listing engine 615 is coupled to the computer-readable medium 605. In a specific implementation, the device listing engine 615 may list the user devices of a user, based on the information displayed in the web portal. The device listing engine 615 may further accept a user's manual input regarding identifiers of user devices associated with the user. In an implementation, the device listing engine 615 may also pre-populate the list of user devices with identifiers of devices known to be associated with the user (e.g., devices the user has previously onboarded and/or offboarded from the network). For instance, the device listing engine 615 may pre-populate the list of user devices with identifiers of devices known to correspond to the user's first-level security profile.

In the example of FIG. 6, the listed device selection engine 620 is coupled to the computer-readable medium 605. In an implementation, the listed device selection engine 620 may facilitate selection of listed user devices. For instance, the listed device selection engine 620 may allow the user to select particular user devices the user wishes to onboard to network resources.

Figure 7:
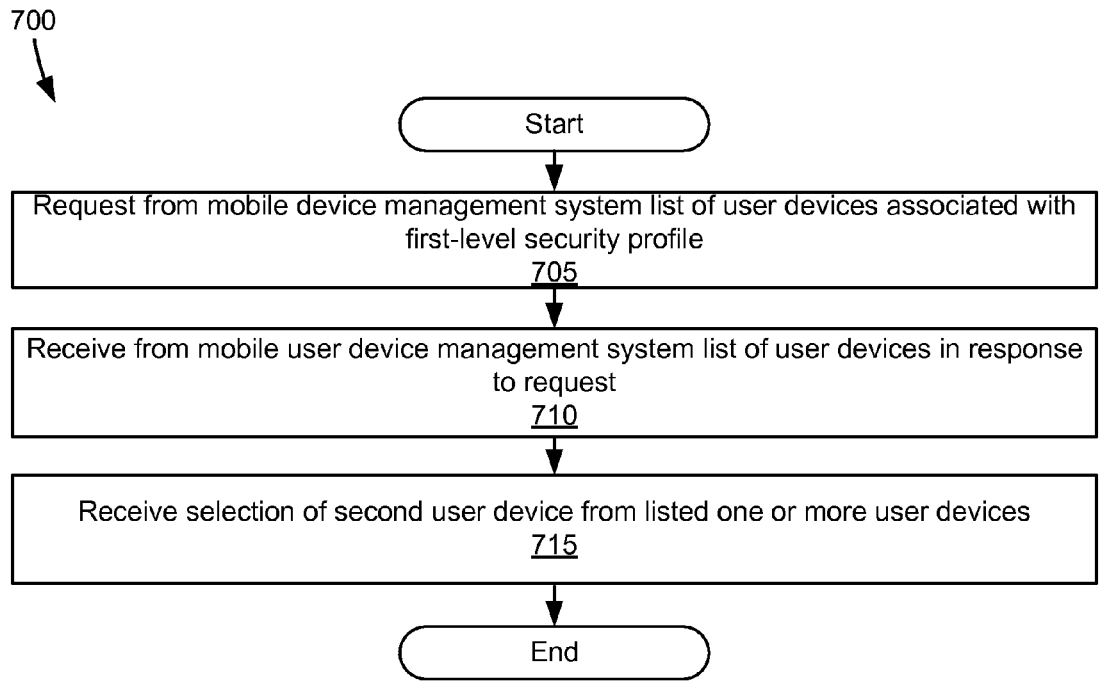
FIG. 7 shows an example of a flowchart of a method for selecting a device for network onboarding, in accordance with an implementation.

FIG. 7 shows an example of a flowchart of a method 700 for selecting a device for network onboarding, in accordance with an implementation. The method 700 is discussed in conjunction with the device selection engine 600, shown in FIG. 6. The modules 705-715 are merely examples of modules in the method 700, and it is noted in some implementations the method 700 is executed with less modules, more modules, or different modules than the modules specifically shown in FIG. 7.

At module 705, a list of devices associated with the user's first-level security profile is requested from an mobile device management system. In an implementation, the MDM system interface engine 610 requests from a mobile device management system (e.g., the mobile device management system 135 in FIG. 1) a list of devices associated with a user's first-level security profile.

At module 710, the list of user devices is received in response to the request. In an implementation, the MDM system interface engine 610 receives the list of user devices in response to the request. The list of user devices may be provided to a web portal (e.g., the web portal managed by the network access system management engine 210). The web portal may display the list of user devices.

At module 715, a selection of the second user device from the listed one or more user devices is received. In an implementation, the listed device selection engine 620 receives the selection of the second user device. In various implementations, the second device is selected from the webpage displayed on the web portal. It is noted that while the method 700 shows selecting only a second device for illustrative simplicity, various implementations provide for selecting an arbitrary number of user devices for a user. As a result, the module 715 may be repeated an arbitrary number of times for other user devices in various implementations.

FIG. 8 shows an example of a device network configuration engine 800, in accordance with an implementation.

In the example of FIG. 8, the device network configuration engine 800 includes a computer-readable medium 805, a device access notification engine 810, a browser extension engine 815, and a network connectivity file transfer engine 820. In an implementation, one or more of the device access notification engine 810, the browser extension engine 815, and the network connectivity file transfer engine 820 includes an "engine," as discussed herein.

In the example of FIG. 8, the computer-readable medium 805 is coupled to the device access notification engine 810, the browser extension engine 815, and the network connectivity file transfer engine 820. In a specific implementation, the computer-readable medium 805 may include a "computer-readable medium," as defined in this paper.

In the example of FIG. 8, the device access notification engine 810 is coupled to the computer-readable medium 805. In an implementation, the device access notification engine 810 may monitor a network access system (e.g., the LAN access system 115 and/or the WAN access system 130 shown in FIG. 1) to see if a device is attempting to access network resources (e.g., the trusted resource system 125 and/or the untrusted resource system 150 shown in FIG. 1). In an implementation, the device access notification engine 810 receives notifications from a network access system management engine (e.g., the network access system management engine 210 in FIG. 2) each time a user device seeks network access. The device access notification engine 810 may provide relevant notifications to the other modules of the device network configuration engine 800.

In the example of FIG. 8, the browser extension engine 815 is coupled to the computer-readable medium 805. In an implementation, the browser extension engine 815 provides a browser extension to a particular user device (e.g., one of the user devices 105 in FIG. 1) seeking to be onboarded to access network resources. A "browser extension," as used in this paper, may refer to anything that extends functionality of a web browser in some way. In various implementations, the browser extension may include plug-ins, add-ins, toolbars, and other elements that can execute within the context of a web browser. In an implementation, the browser extension may comprise no more than a network hyperlink loaded on the web browser, or a dedicated tab of the web browser. In various implementations where one of the user devices 105 is a browser-based device, the browser extension engine 815 may provide a browser extension to the native browser of the browser-based device.

In the example of FIG. 8, the network connectivity file transfer engine 820 is coupled to the computer-readable medium 806. In an implementation, the network connectivity file transfer engine 820 transfers a network connectivity file to one of the user devices 105 seeking to be onboarded. In various implementations where one of the user devices 105 is a browser-based device, the network connectivity file may be compatible with the native browser of the browser-based device. The network connectivity file transfer engine 820 can also receive notifications about whether the network connectivity file was successfully loaded on the user device.

Figure 9:
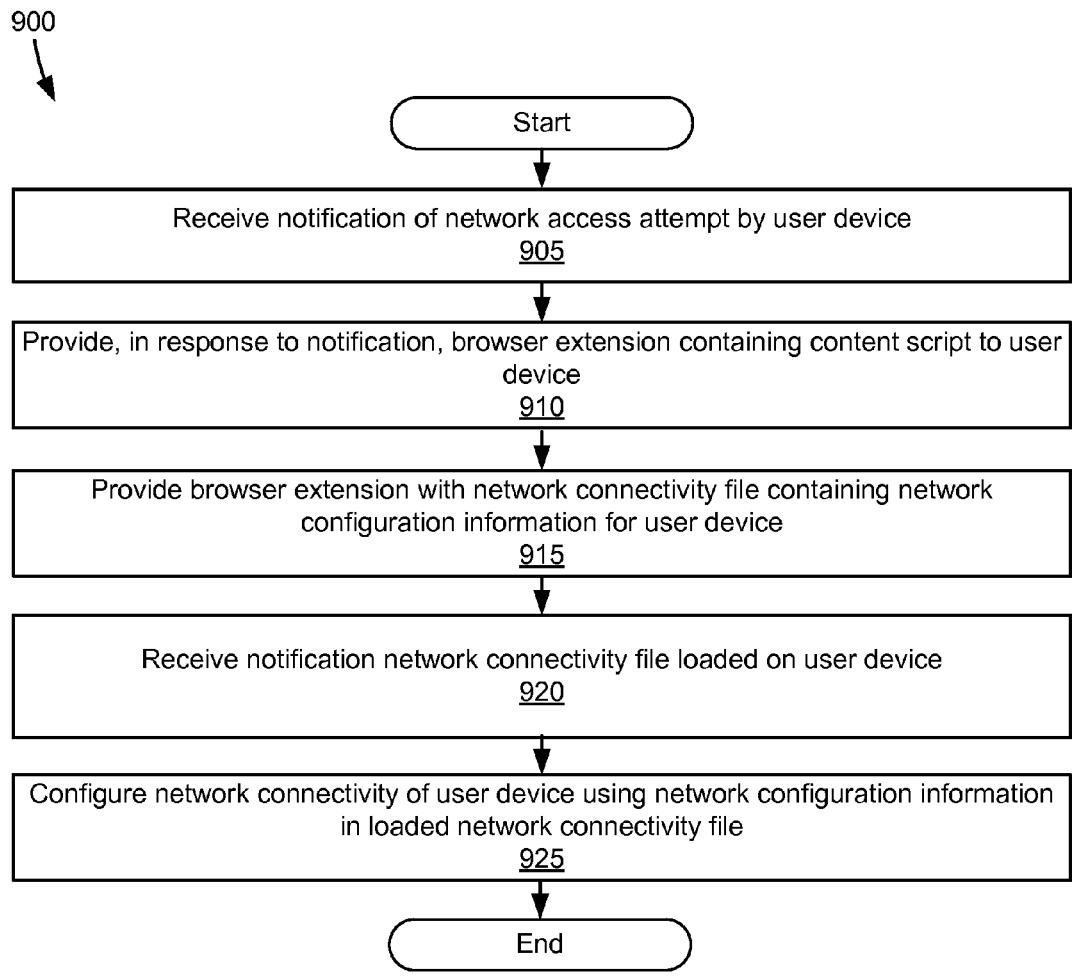
FIG. 9 shows an example of a flowchart of a method for selecting a device for network onboarding, in accordance with an implementation.

FIG. 9 shows an example of a flowchart of a method 900 for selecting a device for network onboarding, in accordance with an implementation. The method 900 is discussed in conjunction with the device network configuration engine 800, shown in FIG. 8. The modules 905-925 are merely examples of modules in the method 900, and it is noted in some implementations the method 900 is executed with less modules, more modules, or different modules than the modules specifically shown in FIG. 9.

At block 905, a notification of a network access attempt by a user device is received. In an implementation, the device access notification engine 810 receives a notification of a network access attempt by a user device (e.g., one of the user devices 105 in FIG. 1). In some implementations, the notification may come from a network access system (e.g., the LAN access system 115 and/or the WAN access system 130 in FIG. 1). The notification may indicate the user device is attempting to access network resources (e.g., the trusted resource system 125 and/or the untrusted resource system 150 in FIG. 1). In an implementation, the device access notification engine 810 provides the notification of the network access attempt to the other engines of the device network configuration engine 800.

At block 910, a browser extension containing a content script is provided to the user device in response to the notification. In an implementation, the browser extension engine 815 provides a browser extension to the user device seeking network access. The browser extension may be installed into the web browser of the user device. In an implementation where the user device comprises a browser-based user device, the browser extension may be loaded into the native web browser of the user device.

At block 915, a network connectivity file containing network configuration information for the user device is provided to the browser extension. In an implementation, the network connectivity file transfer engine 820 provides the browser extension with a network connectivity file that contains network configuration information for the user device. In a specific implementation, the web browser of the user device may load the network connectivity file into the browser extension. In an implementation where the user device comprises a browser-based user device, the network connectivity file is loaded into the browser extension of the native web browser.

At block 920, a notification the network connectivity file loaded on the user device is received. In an implementation, the network connectivity file transfer engine receives a notification the network connectivity file successfully loaded on the user device. The notification may come from the browser extension provided to the user device.

At block 925, network connectivity of the user device is configured using the configuration information in the network connectivity file. In an implementation, a device network configuration engine (e.g., the device network configuration engine 250, shown in FIG. 2) may configure the network connectivity of the user device based on the configuration information in the network connectivity file.

FIG. 10 shows an example of a screen 1000 for a user to select a device for network authentication, in accordance with an implementation. In the example of FIG. 10, the screen 1000 includes an add-in tab 1005, a webpage 1010, a username 1015, an ownership listing 1020, a terms and services checkbox 1025, and an enrollment button 1030. In the example of FIG. 10, the add-in tab 1005 may include an add-in to a web browser. In this example, the web browser may include a native web browser (e.g., a Chrome® browser) of a browser-based user device (e.g., a Chromebook®). The webpage 1010 may include a web portal for network access. In the example of FIG. 10, the webpage 1010 provides a user with the ability to access a network. The user may have been redirected to the webpage 1010 upon opening the native web browser of the user device. The username 1015 may include a unique identifier of the user. the username 1015 may be used to identify the user's first-level security profile, as discussed in this paper. The ownership listing 1020 may provide the degree of network access the user may wish to have. In this example, the ownership listing 1020 may include a first ownership status for corporate-issued devices, and a second ownership status for personal devices the user has brought to work. The terms and services checkbox 1025 may indicate the user has agreed to the terms and services of network access. The enrollment button 1030 may allow the user to enroll the user device and initiate network access.

Figure 11:
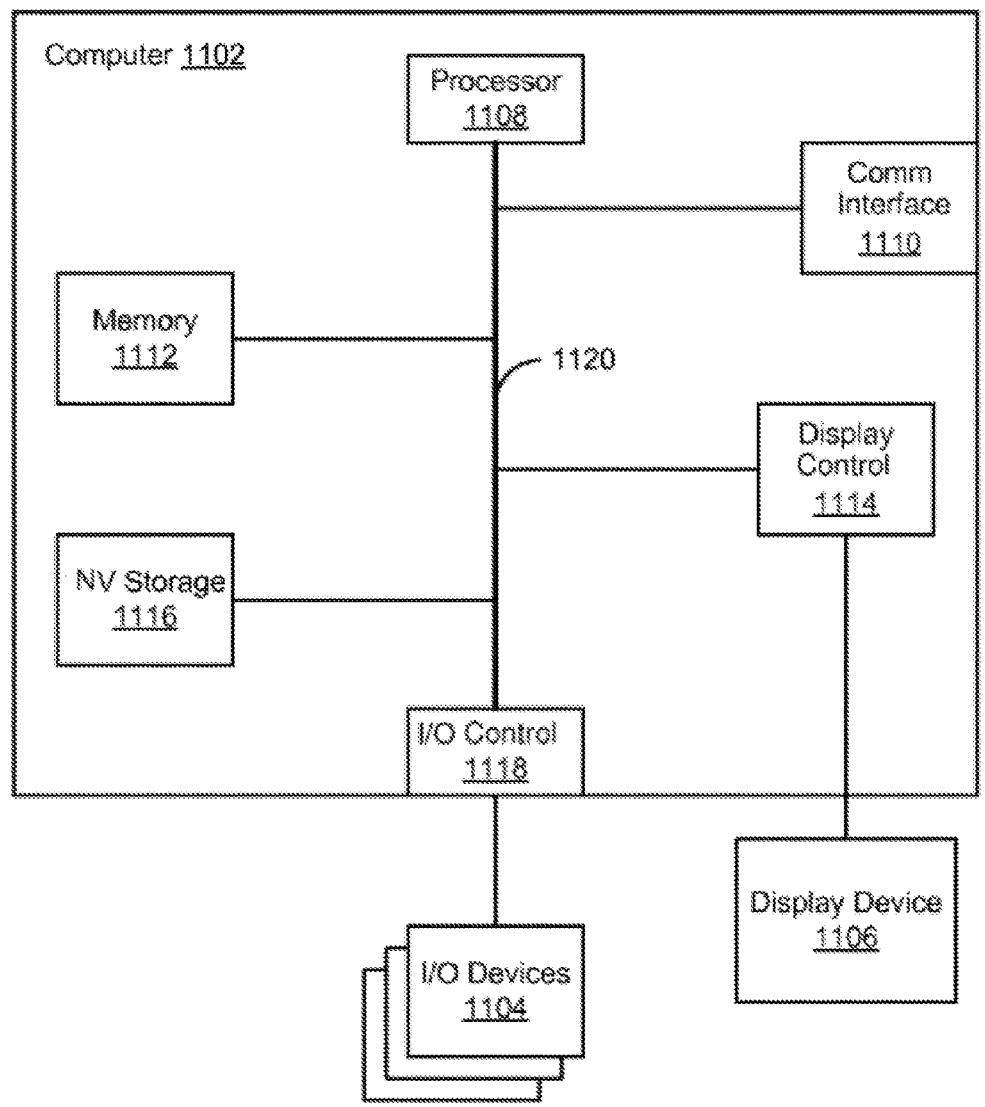
FIG. 11 shows an example of a computer system, in accordance with an implementation.

FIG. 11 shows an example of a computer system 1100. In the example of FIG. 11, the computer system 1100 can be a conventional computer system that can be used as a client computer system, such as a wireless client or a workstation, or a server computer system. The computer system 1100 includes a computer 1102, I/O devices 1104, and a display device 1106. The computer 1102 includes a processor 1108, a communications interface 1110, memory 1112, display controller 1114, non-volatile storage 1116, and I/O controller 1118. The computer 1102 can be coupled to or include the I/O devices 1104 and display device 1106.

In the example of FIG. 11, the computer 1102 interfaces to external systems through the communications interface 1110, which can include a modem or network interface. It will be appreciated that the communications interface 1110 can be considered to be part of the computer system 1100 or a part of the computer 1102. The communications interface 1110 can be an analog modem, ISDN modem, cable modem, token ring interface, satellite transmission interface (e.g. "direct PC"), or other interfaces for coupling a computer system to other computer systems.

In the example of FIG. 11, the processor 1108 can be, for example, a conventional microprocessor such as an Intel Pentium microprocessor or Motorola power PC microprocessor. The memory 1112 is coupled to the processor 1108 by a bus 1120. The memory 1112 can be Dynamic Random Access Memory (DRAM) and can also include Static RAM (SRAM). The bus 1120 couples the processor 1108 to the memory 1112, also to the non-volatile storage 1116, to the display controller 1114, and to the I/O controller 1118.

In the example of FIG. 11, the I/O devices 1104 can include a keyboard, disk drives, printers, a scanner, and other input and output devices, including a mouse or other pointing device. The display controller 1114 can control in the conventional manner a display on the display device 1106, which can be, for example, a cathode ray tube (CRT) or liquid crystal display (LCD). The display controller 1114 and the I/O controller 1118 can be implemented with conventional well known technology.

In the example of FIG. 11, the non-volatile storage 1116 is often a magnetic hard disk, an optical disk, or another form of storage for large amounts of data. Some of this data is often written, by a direct memory access process, into memory 1112 during execution of software in the computer 1102. One of skill in the art will immediately recognize that the terms "machine-readable medium" or "computer-readable medium" includes any type of storage device that is accessible by the processor 1108 and also encompasses a carrier wave that encodes a data signal.

In the example of FIG. 11, the computer system 1100 is one example of many possible computer systems which have different architectures. For example, personal computers based on an Intel microprocessor often have multiple buses, one of which can be an I/O bus for the peripherals and one that directly connects the processor 1108 and the memory 1112 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 1112 for execution by the processor 1108. A Web TV system, which is known in the art, is also considered to be a computer system, but it can lack some of the features shown in FIG.

11, such as certain input or output devices. A typical computer system will usually include at least a processor, memory, and a bus coupling the memory to the processor.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described in this paper relate to apparatus for performing the operations. The apparatus can be specially constructed for the required purposes, or it can comprise a general purpose computer selectively activated or reconfigured by a computer program stored in the computer. Such a computer program can be stored in a computer readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

For purposes of explanation, numerous specific details are set forth in order to provide a thorough understanding of the description. It will be apparent, however, to one skilled in the art that implementations of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one implementation", "an implementation", "some implementations", "various implementations", "certain implementations", "other implementations", "one series of implementations", or the like signifies that a particular feature, design, structure, or characteristic described in connection with the implementation is included in at least one implementation of the disclosure. The appearances of, for example, the phrase "in one implementation" or "in an implementation" in various places in the specification are not necessarily all referring to the same implementation, nor are separate or alternative implementations mutually exclusive of other implementations. Moreover, whether or not there is express reference to an "implementation" or the like, various features are described, which may be variously combined and included in some implementations, but also variously omitted in other implementations. Similarly, various features are described that may be preferences or requirements for some implementations, but not other implementations.

The language used herein has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the implementations is intended to be illustrative, but not limiting, of the scope, which is set forth in the following claims.

What is claimed is:

1. A system comprising:
   a first-level security profile engine;
   a second-level security profile engine coupled to the first-level security profile engine;
   a device selection engine coupled to the second-level security profile engine;
   a device network configuration engine coupled to the device selection engine;
   wherein, in operation:
   the first-level security profile engine assigns a first-level security profile to a user of a first user device and a second user device, the first user device and the second user device requesting access to a network;
   the second-level security profile engine assigns a first second-level security profile to the first user device, the first second-level security profile providing first network configuration information for the first user device;
   the device selection engine identifies, through a web portal, an association of the second user device with the user;
   the second-level security profile engine assigns a second second-level security profile to the second user device associated with the first-level security profile, the second second-level security profile providing second network configuration information for the second user device;
   the device network configuration engine configures the first user device to access the network based on the first network configuration information.

2. The system of claim 1, wherein the device network configuration engine configures the second user device to access the network based on the second network configuration information.

3. The system of claim 1, wherein the device selection engine includes a web portal request engine, a device listing engine, and a listed device selection engine, comprising:
   a network access system management engine configured to maintain a web portal for accessing the network;
   the web portal request engine, which is configured to request from the web portal a list of user devices to associate with the first-level security profile;
   the device listing engine, which is configured to receive from the web portal a listing of one or more user devices in response to the request for the list;

the listed device selection engine, which is configured to receive a selection from the user of the second user device from the one or more listed user devices.

4. The system of claim 1, wherein the device selection engine comprises:
a mobile device management (MDM) engine configured to request from an MDM system a list of user devices to associate with the first-level security profile;
a device listing engine configured to receive from the MDM system a listing of one or more user devices in response to the request for the list;
a listed device selection engine configured to receive a selection from the user of the second user device from the one or more listed user devices.

5. The system of claim 1, wherein the first user device comprises a browser-based user device with a web browser.

6. The system of claim 1, wherein the first user device includes a web browser, comprising:
a device access notification engine configured to receive a notification of the access to the network by the first user device;
a browser extension engine configured to provide, in response to the notification of the access, a browser extension to the web browser of the first user device;
a network file connectivity transfer engine configured to provide a network connectivity file to the browser extension;
wherein, in operation, the device network configuration engine configures the first user device to access the network based at least in part on information in the network connectivity file.

7. The system of claim 1, wherein the first user device includes a native web browser.

8. The system of claim 1, further comprising a third-level security profile engine, wherein in operation the third-level security profile engine assigns a first third-level security profile to the first user device, the first third-level security profile providing first device configuration information for the first user device.

9. The system of claim 8, wherein the third-level security profile engine assigns a second third-level security profile to the second user device, the second third-level security profile providing second device configuration information for the second user device.

10. A method comprising:
assigning a first-level security profile to a user of a first user device and a second user device, the first user device and the second user device requesting access to a network;
assigning a first second-level security profile to the first user device, the first second-level security profile providing first network configuration information for the first user device;
identifying, through a web portal, an association of the second user device with the user;
assigning a second second-level security profile to the second user device associated with the first-level security profile, the second second-level security profile providing second network configuration information for the second user device;
configuring the second user device to access the network in accordance with the second network configuration information.

11. The method of claim 10, further comprising configuring the second user device to access the network based on the second network configuration information.

12. The method of claim 10, further comprising:
maintaining a web portal for accessing the network;
requesting from the web portal a list of user devices to associate with the first-level security profile;
receiving from the web portal a listing of one or more user devices in response to the request for the list;
receiving a selection from the user of the second user device from the one or more listed user devices.

13. The method of claim 10, further comprising:
requesting from a mobile device management (MDM) system a list of user devices to associate with the first-level security profile;
receiving from the MDM system a listing of one or more user devices in response to the request for the list;
receiving a selection from the user of the second user device from the one or more listed user devices.

14. The method of claim 10, wherein the first user device comprises a browser-based user device.

15. The method of claim 10, further comprising:
receiving a notification of the access to the network by the first user device;
providing, in response to the notification of the access, a browser extension to a web browser of the first user device;
providing a network connectivity file to the browser extension;
configuring the first user device to access the network based at least in part on information in the network connectivity file.

16. The method of claim 10, wherein the first user device includes a native web browser.

17. The method of claim 10, further comprising assigning a first third-level security profile to the first user device, the first third-level security profile providing first device configuration information for the first user device.

18. The method of claim 17, further comprising assigning a second third-level security profile to the second user device, the second third-level security profile providing second device configuration information for the second user device.

19. The method of claim 10, wherein the method is executed by a processor of a user-based network onboarding system.

20. A non-transitory computer readable medium comprising instructions, the instructions being executable by a processor to perform a method, the method comprising:
assigning a first-level security profile to a user of a first user device and a second user device, the first user device and the second user device requesting access to a network;
assigning a first second-level security profile to the first user device, the first second-level security profile providing first network configuration information for the first user device;
identifying, through a web portal, an association of the second user device with the user;
assigning a second second-level security profile to the second user device associated with the first-level security profile, the second second-level security profile providing second network configuration information for the second user device;
configuring the second user device to access the network in accordance with the second network configuration information.

* * * * *